United States Patent [19]

Stoy et al.

[11] 4,123,406
[45] Oct. 31, 1978

[54] METHOD OF PREPARING SHAPED ARTICLES FROM CROSS-LINKED HYDROGELS

[75] Inventors: Artur Stoy; Renata Urbanova, both of Prague, Czechoslovakia

[73] Assignee: Ceskoslovenska akademie ved, Prague, Czechoslovakia

[21] Appl. No.: 655,208

[22] Filed: Feb. 4, 1976

Related U.S. Application Data

[62] Division of Ser. No. 127,375, Mar. 23, 1971, abandoned.

[30] Foreign Application Priority Data

Mar. 26, 1970 [CS] Czechoslovakia .................. 2021/70

[51] Int. Cl.$^2$ ............................................. C08L 35/04
[52] U.S. Cl. ...................... 260/29.6 AN; 260/29.6 H; 260/29.6 AB; 260/29.6 MN; 526/49; 526/23; 526/236; 526/341; 521/63; 521/48.1
[58] Field of Search ............ 260/29.6 AN, 29.6 AB, 260/29.6 H, 88.7 R, 88.7 C, 88.7 B, 2.5 R; 252/316; 526/236, 341

[56] References Cited

U.S. PATENT DOCUMENTS

| 2,763,636 | 9/1956 | Davis | 260/29.6 AB |
|---|---|---|---|
| 2,792,276 | 5/1957 | Kaupin et al. | 8/55 |
| 2,812,314 | 11/1957 | Basdekis | 260/29.6 AN |
| 2,812,317 | 11/1957 | Barrett | 260/29.6 AN |
| 2,861,059 | 11/1958 | Mowry et al. | 260/29.6 AN |
| 2,952,651 | 9/1960 | Armen et al. | 260/29.6 AN |
| 2,970,977 | 2/1961 | Sunden et al. | 260/30.8 |
| 3,208,962 | 9/1965 | Taniyama | 260/29.6 AN |
| 3,410,941 | 11/1968 | Dagon et al. | 526/236 |
| 3,479,312 | 11/1969 | Fujii et al. | 260/29.6 AN |
| 3,573,235 | 3/1971 | Yamamoto et al. | 260/8 |
| 3,574,177 | 4/1971 | Nakajima et al. | 260/29.6 AB |
| 3,864,323 | 2/1975 | Stoy | 526/236 |
| 3,897,382 | 7/1975 | Stoy et al. | 260/29.6 AN |

Primary Examiner—Harold D. Anderson

[57] ABSTRACT

A method of preparing cross-linked hydrogels in the form of shaped articles, insoluble in any solvent but swellable in water and in aqueous liquids, is provided. The method comprises polymerizing acrylonitrile alone or with a minor amount up to 15% by weight of monoethylenically unsaturated monomers copolymerizable with acrylonitrile under conditions of radical polymerization in concentrated, i.e. 50 to 72%, nitric acid in the absence of any added chain-transfer and cross-linking agents, said monomer or monomers being used in concentrations making possible cross-linking by chain transfer onto the monomer, i.e. in concentrations ranging from 15 to 50%, preferably from 25 to 40% by weight, at temperatures ranging from 0° to 50° C, preferably from 5° to 20° C. The polymerization is carried out in a mold. The lyogel thus obtained is then kept within the same temperature range until the desired swelling capacity in water is reached, and the nitric acid is removed by washing the casting in water or in aqueous liquids.

1 Claim, No Drawings

METHOD OF PREPARING SHAPED ARTICLES FROM CROSS-LINKED HYDROGELS

This application is a division of U.S. application Ser. No. 127,375, filed Mar. 23, 1971, now abandoned.

BACKGROUND OF THE INVENTION

The present invention relates to a method for preparing cross-linked hydrogels which are tough, rubbery and comparatively very strong, considering their content of water at swelling equilibrium. Their tensile strength is, at the same content of water, higher by 1 - 2 orders than that of usual known hydrogels such as sparingly cross-linked hydroxyethyl methacrylate polymers. High strength, elasticity and permeability to water and solutes, in conjunction with physiological inertness, of the instant hydrogels makes possible new useful applications in surgery and in various fields of industry. The outstanding physical properties of the new hydrogels are due to their particular structure of two different sorts of macromolecular networks, one formed by polyacrylonitrile domains and possessing physical bonds (dipoles, hydrogen bonds etc.), the other formed by covalent bonds caused by chain transfer onto the monomer during the polymerization. The last mentioned covalent network is thinner than the physical network mentioned in the preceding sentence, and is, moreover, formed by considerably long chain bridges. As a result, gels with a comparatively low degree of hydrolysis and having a swelling capacity in water not exceeding about 50% by weight can be partially oriented by stretching, particularly if the stretching is carried out at temperatures higher than about 70° C and the stretched hydrogel is cooled to room temperature in stretched condition. The stretching degree depends upon the swelling capacity (which is directly proportional to the degree of hydrolysis) and upon the density of the covalent network, being inversely proportional in both cases. The partially oriented hydrogels maintain a considerable elasticity and their deformation takes place so evenly that the stress-strain curve approaches a straight line. More hydrolyzed gels cannot be oriented permanently at room temperature, and their behavior is more like that of vulcanized rubbers. With an increasing degree of hydrolysis the strength decreases, due to decreasing content of dry substance (the solid remainder after evaporating the water) in swelled condition. As could be expected, at high degrees of swelling, the cross-linking affects adversely the structural strength, particularly in the case of more tightly cross-linked gels.

As can be seen, skillful combination of the cross-linking degree with the degree of partial hydrolysis makes it possible to control the physical characteristics of the instant hydrogels so that they are suitable for various end uses.

Hydrogels swelled in aqueous liquids incapable of dissolving polyacrylonitrile possess the two above mentioned kinds of macromolecular networks simultaneously. The two networks can be differentiated by swelling the hydrogel in a liquid capable of dissolving polyacrylonitrile. Then, the first mentioned sort of physically cross-linked network is dissolved and only the covalent bonds remain intact. A suitable solvent for polyacrylonitrile is e.g. dimethyl sulfoxide. The hydrogen swells considerably therein, because the solvent is solvating also the acrylamide units. The swelling capacity depends then on the density of the covalent network. If the covalent network is thin and the solvent is very effective (such as a 60% sodium rhodanide solution in water), the covalent bonds can be partially destroyed by osmotic pressure and the hydrogel collapses and partially dissolves. In such extreme cases, the presence of the covalent network must be proved by the use of finer methods, e.g. mechanometric analysis.

Moderate or decreased temperature during the hydrolysis is obviously necessary to avoid uncontrollable oxidation of the polymer by nitric acid, such oxidation taking place slowly above about 45° C and rapidly above about 50° C. The same holds naturally for the partial hydrolysis. The temperature up to which the gel swelled by concentrated nitric acid can be heated without danger of an uncontrollable decomposition depends on the degree of purity, the impurities being more easily oxidized.

When polymerizing acrylonitrile in nitric acid to obtain spinning solutions of non-crosslinked polyacrylonitrile, stabilizers for preventing oxidation can be added, e.g. urea. This is, however, practically impossible in the present process, because the stabilizers act simultaneously as chain transfer agents. This side-effect is desirable when preparing solutions of polyacrylonitrile since the linear chains are not only shortened, but simultaneously their length becomes more uniform. As said above, any chain transfer agents are to be excluded so that the chain transfer affects the monomer only. Thus, the absence of stabilizers necessitates the use of lower temperatures to avoid the danger of rapid or even explosive decomposition, coupled with the liberation of poisonous nitrous gases.

It has been found, however, that lower temperatures, namely room or slightly decreased temperatures, are advantageous also for other reasons. The chain transfer onto the monomer is preferred over the less desirable chain transfer onto the polymer, the latter being more temperature-dependent than the former. Moreover, the heat of polymerization is more easily dissipated at lower temperatures. A further advantageous effect of decreased temperatures is an increased length of polymer segments between the points of cross-linking, as well as an increased length of the crosslinks and branches, all resulting in better physical characteristics of the hydrogel. All of this contributes to the explanation of the unusual strength and elasticity of the instant hydrogels.

An object of the invention is therefore a new method for manufacturing highly swellable and strong, elastic hydrogels, well tolerated by living tissues and permeable to water and low-molecular solutes, and insoluble in any solvent.

Another object of the invention is to provide a new method for manufacturing hydrogels of the above disclosed kind in an economical, reliable and reproducible way.

COPENDING APPLICATION

The copending U.S. patent application Ser. No. 526,718, filed Nov. 25, 1974 by Artur Stoy, which is a continuation-in-part of Ser. No. 319,309, filed Dec. 29, 1972, now abandoned, which is itself a continuation-in-part under Rule 60 of Ser. No. 43,926, filed June 5, 1970, now abandoned, for which priority under 35 U.S.C. 119 for Czechoslovak Application PV 4200-69, dated June 13, 1969 is claimed, discloses a method for preparing hydrogels in which copolymers of acrylonitrile with acrylamide, acrylic acid and diacryl imide are prepared by polymerizing or copolymerizing acrylonitrile dissolved in concentrated aqueous salt solutions containing zinc chloride as the main or sole component, if desired in the presence of a small amount of a cross-linking agent.

The predominantly polyacrylonitrile containing lyogel thus obtained is partially hydrolyzed either by increasing the temperature or by decreasing the pH-value, e.g. using a hydrogen halide which readily dissolves in the zinc chloride solution and penetrates into the lyogel. Zinc and other metal cations are then removed by treating the gel with diluted solutions of electrolytes which form insoluble precipitates therewith. The method leads to the formation of strong, transparent, rubbery hydrogels, well tolerated by living tissues, superior in many respects to hydrogels used hitherto. The polymerization in zinc chloride solutions, containing variable admixtures of other heavy metal chlorides, is, however, often too rapid, so that it is sometimes not easy to dissipate evenly the heat of polymerization and to keep the polymerization temperature sufficiently low, uniform and constant.

SUMMARY OF THE INVENTION

The above mentioned shortcomings are fully overcome if concentrated nitric acid is used as the solvent instead of zinc chloride containing salt solutions, provided that the initial monomer concentration is kept high and the temperature of polymerization sufficiently low, so that the resulting polymer or copolymer is covalently cross-linked in the absence of any cross-linking agent added except the monomer itself. The polymerization of acrylonitrile in nitric acid takes place at a slow rate so that it can be easily controlled and carried out at constant temperature, the heat of polymerization being evenly dissipated even after the gel-point is attained. At the same time, the partial hydrolysis following the polymerization is also easily controllable and entirely uniform, since the hydrolysis takes place in a homogeneous medium, nitric acid being a solvent for the monomer, swelling agent for the cross-linked polymer and hydrolytic agent simultaneously.

Until now, partial hydrolysis of polyacrylonitrile in oxy-acids was always carried out under conditions leading to soluble, non-cross-linked polymers or copolymers, which were used either for spinning fibers or for the manufacture of water-soluble preparations such as synthetic size for use in the textile industry. For fiber production, hydrolysis was usually avoided since partly hydrolyzed acrylic fibers are weather-unstable. Fiber-forming acrylic polymers are linear, with an average molecular weight from about 30,000 to about 100,000. For textile sizes and similar preparations, the hydrolysis should be almost complete to ensure water-solubility, and the average molecular weight is low so as to permit controlling the viscosity of the used solutions. Cross-linked hydrogels from copolymers of acrylonitrile with acrylamide, particularly such prepared by controlled partial acid hydrolysis in a homogeneous medium, were not known. In the manufacture of fibers and water-soluble polymers, any cross-linking is undesired and the polymerization is therefore carried out in such a manner that the formation of insoluble gels is excluded. Therefore, the initial concentration of acrylonitrile in solution-polymerization was always kept low and the monomer was sometimes added gradually in a continuous process. Simultaneously, suitable chain-transfer agents were added. In the manufacture of water-soluble products, the polymerization, carried out with comparatively high initiator concentrations, was always separated from the hydrolysis for which usually sulfuric acid was used.

Another feature differentiating the hydrogels of the invention from fine particles or beads of suspension polymers, such as are used for ion exchange or gel chromatography, is the bulk character. The hydrogels of the invention are always manufactured in a mold by polymerization casting, the final product being an article consisting of a single giant macromolecule. The final article is either cast directly in a mold, or obtained from a large casting by mechanical working. The invention does not relate to finely divided particles or beads.

Thus, the present invention provides a method for manufacturing shaped articles from strong, rubbery hydrogels, cross-linked by covalent bonds and insoluble in any solvent, the method consisting in direct polymerization of acrylonitrile or copolymerization thereof with up to 15% by weight of other monomers in 50 to 72% nitric acid in the absence of usual cross-linking agents as well as in the absence of chain-transfer agents other than the monomer itself. The initial concentration of the monomer or monomers is high, ranging from 15 to 50% by weight, preferably from 25 to 40% by weight. The temperatures used range from 0° to 50° C, preferably from 5° to 20° C. The polymerization is carried out without stirring. The casting is then kept at temperatures within the above stated range of 0° – 50° C until a desired degree of hydrolysis, determinable by equilibrium swelling in water after washing off the acid is achieved, the swelling capacity lying within the range of about 20 to 95% by weight of water, preferably from about 40 to about 70% of water. Thereafter, the nitric acid is removed by washing in water, combined, if desired, with neutralization.

The hydrogel casting is then mechanically worked, if needed, to the final article. The casting can be also used as such, without any mechanical working, if the size of the mold and the degree of hydrolysis are appropriately chosen. The formation of the casting is usually accompanied by certain shrinkage caused by polymerization. In rigid molds, the shrinkage results in the formation of vacuum voids or depressions on the surface. This problem can be solved in a known way, using elastic molds or molds with elastic gaskets between rigid (e.g. glass) plates. Another known way to compensate for the shrinkage is polymerization under pressure.

DESCRIPTION OF THE PREFERRED EMBODIMENTS

As explained above, the method can be adjusted to obtain gels with properties suitable for various end uses, by choosing suitable initial polymer concentration, suitable temperature of polymerization as well as suitable temperature and duration of the partial hydrolysis, without exceeding the conditions needed for cross-linking by chain transfer onto the monomer.

For instance, at high degrees of hydrolysis of sparingly cross-linked polymers, soft, highly swellable hydrogels of sufficient strength and elasticity are obtained, displaying very low modulus of elasticity and suitable e.g. for replacing fat tissues in surgery. Products with medium degrees of hydrolysis, corresponding to 50 – 70% of water content at swelling equilibrium, combined with low cross-linking, are similar to soft vulcanized rubber. Their modulus of elasticity increases considerably with increasing density of cross-linking and decreasing degree of hydrolysis. Such tough rubbery hydrogels can be used e.g. in surgery whenever such characteristics may be desirable. To obtain extreme tensile strength at high modulus and moderate elastic elongation up to about 100% of the rest length, low degrees of hydrolysis together with low degrees of cross-linking are suitable, making possible partial orientation by stretching at temperatures above 70° C and cooling down in stretched condition.

Hard, non-elastic and finely porous hydrogels are obtained if the initial monomer concentration is increased over 40%. Then the degree of cross-linking is high, and the polymer, being insoluble in the monomer, precipitates first from the solution in the form of white flocks which are afterwards cemented together by cross-linked hydrogel, formed as soon as the monomer concentration sinks and a continuous network is formed, including the precipitated polymer. The latter acts as an active filler, being connected with the surrounding network by numerous bonds. During the following hydrolysis, the precipitate remains almost unhydrolyzed and keeps its active filler properties. When the acid is washed off, the hydrogel network shrinks, but the "filler" remains unshrunk so that numerous microvoids and pores are formed. Similar microvoids are formed during the polymerization since the "filler" forms a skeleton preventing formation of large vacuoles.

As molds in which the three-dimensional polymerization as well as the subsequent partial hydrolysis are performed, vessels from flexible polymers, insoluble in the monomer mixture and resistant to concentrated nitric acid are preferably used. Glass can be used only for manufacturing sheets, with elastic sealing gasket between the plates, allowing for the shrinkage. As flexible plastics, those impenetrable for molecular oxygen such as PVC or poly(methyl methacrylate) are preferred. Polyolefins can be used too, however, if the access of oxygen or air to the outer wall of the mold is excluded; otherwise the surface of the casting is somewhat sticky and, after washing in water, rather rough. The flexible mold allows for shrinkage during the polymerization so that no bubbles or vacuoles are formed.

The reaction mechanism of the cross-linking can be explained by formation of three-functional molecules, probably according to the following equation:

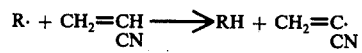

As the free radical is more reactive than the double bond, a long chain of added monomer units can be formed prior to a reaction of the double bond with another growing free radical — hence the formation of the long crosslinks mentioned above.

The cross-linking bridges do not contain easily hydrolyzable atoms and are therefore stable in concentrated nitric acid. Nitric acid causes practically no chain transfer. The role of a chain transferring agent is taken by the monomer, and cross-linking occurs as soon as the concentration of the three-functional molecules is sufficiently high. Organic solvents prevent cross-linking of this kind, possessing usually considerably higher chain transfer constants and being present in higher concentrations than the monomer.

If it is desired to speed up the polymerization at low temperatures, it is possible to use for this purpose well known redox type initiators with an addition of ions of iron, copper, silver, manganese, titanium and the like, or to increase in a known manner the concentration of the initiator.

Although the partial hydrolysis can be carried out simply by allowing the primary lyogel to stand for 8 to 30 days at ambient temperature it is better to control the temperature and time of the hydrolysis exactly to obtain exactly reproducible results. Ambient temperature fluctuates usually too much to be relied upon.

For neutralizing nitric acid during the removal thereof from the gel, any alkaline substance can be used. Strong alkalies are to be used carefully, if further alkaline hydrolysis is undesired. To obtain colorless and uniformly hydrolyzed gels, weak neutralizing agents such as sodium bicarbonate or calcium carbonate are preferred.

To obtain very strong, tough, rubbery hydrogels, the degree of the partial hydrolysis can be, preferably, adjusted in such a manner that the gel, after having been washed to neutrality and completely swelled to equilibrium in an aqueous medium in which it is to be finally used for a long term, may not be swelled much more by said aqueous medium than it was previously swelled by nitric acid. Thereby excellent mechanical properties can be attained since the internal stress provoked by the swelling pressure is excluded. Moreover, the final casting has then the same size as the mold. Thanks to long cross-links, however, hydrogels which are more highly swelled, so as to be larger than the mold in which the polymerization and hydrolysis have been performed, are still sufficiently strong for many end-uses.

Apart from amide groups, the hydrolysis step gives rise to carboxylic and imide groups, but usually in lower concentrations. Amide groups can be partially converted to carboxylic groups by treating the hydrogel with diluted nitrous acid, that is by impregnating the hydrogel first with a solution of sodium nitrite, followed by acidification. Another method for increasing the content of carboxylic groups is by partial alkaline hydrolysis, following the first step of partial acidic hydrolysis and washing.

The hydrogels containing carboxylic groups may be treated with trivalent cations of aluminium, chromium or iron, resulting in ionic cross-linking. Hydrogels so treated display reduced swellability and increased tensile strength. Such ionic cross-links are, however, unstable in aqueous alkaline media, e.g. in diluted sodium bicarbonate solutions, so that they can be used only in neutral or weakly acid solutions.

Subsequent cross-linking is possible by treating the hydrogel with more-than-monofunctional compounds capable of reacting with amide, carboxyl or nitrile groups in aqueous solutions, such as with formaldehyde or its derivatives such as hexamethylene tetramine or dimethylol urea in presence of an acid.

The following Examples are given as illustrative only and, it is to be understood, do not limit the invention to the specific details thereof.

EXAMPLE 1

30 parts by weight of acrylonitrile were dissolved in 70 parts of colorless 65% nitric acid and 0.6 part of a 10% aqueous solution of ammonium peroxodisulfate (persulfate) was stirred thereinto. The solution was then poured into a mold formed from PVC, having a wall thickness of 0.2 mm, and thermostated under carbon dioxide at 15° C. The polymerization and hydrolysis lasted three weeks. Then the gel was removed from the mold in streaming water and washed first in water, then in an about 2% sodium bicarbonate solution and again in water to neutral reaction. The tough, rubbery, turbid gel was insoluble in any solvent included solvents for polyacrylonitrile, in which it only swelled but the swollen gel returned, when washed again in water, back to its previous size and shape. Its water content at swelling equilibrium amounted to 58% by weight. It could be used in surgery for making prostheses or for manufacturing sealing gaskets for water pumps or tubings kept permanently in wet condition, for dialysis etc.

EXAMPLE 2

32 parts by weight of acrylonitrile were dissolved in 68 parts of 71% nitric acid and 0.4 part of a 10% aqueous ammonium persulfate solution was added. The solution was poured into a thin mold formed from PVC and left standing for 12 days at 23° C. Then the casting was removed from the slightly conical mold and washed to neutrality. At swelling equilibrium, the hydrogel contained 64% by weight of water, was very elastic, strong and transparent.

EXAMPLE 3

23.5 ml of acrylonitrile were mixed with 15 ml of colorless 65% nitric acid and cooled to 15° C while stirring. The polymerization was initiated by stirring in 0.5 ml of a 10% potassium peroxodisulfate solution in water and 1 drop of a 10% aqueous silver nitrate solution. The solution was allowed to polymerize under a carbon dioxide blanket for 48 hours at 23° C. There was obtained a hard, porous white mass which was heated, still in a PVC mold, for 12 hours at 45° C, washed in warm 5% potassium carbonate solution to neutrality and then boiled for 30 minutes in several times exchanged water. The highly cross-linked, finely porous hydrogel possessed the exchange characteristics of a weakly basic ion exchanger and could be used e.g. as filter material or as a carrier for a catalyst.

It is clear that various initiators for radical polymerization, compatible with concentrated nitric acid, can be used. Peroxodisulfates are very convenient and effective. If desired, they may be activated by small quantities of heavy metal ions.

Without further analysis, the foregoing so fully reveals the gist of present invention that others can by applying current knowledge readily adapt it for various applications without omitting features that, from the standpoint of prior art fairly constitute essential characteristics of the generic or specific aspects of this invention. Therefore such adaptations should and are intended to be comprehended within the meaning and range of equivalence as act forth in the following claims.

What is claimed as new and desired to be protected by Letters Patent is set forth in the appended claims.

1. A method for preparing a shaped article from a cross-linked hydrogel swellable in water and in aqueous solution, consisting of the steps of
   (a) polymerizing acrylonitrile alone or with a minor amount of a monoethylenically unsaturated monomer copolymerizable therewith, in concentrated nitric acid under radical polymerization conditions without adding additional chain-transfer and cross-linking agents and in the absence of any organic dispersion medium, said monomer being used in a concentration ranging from 25 to 40% by weight, based on the weight of the total mixture, at temperatures not exceeding 40° C, in a mold without stirring to produce a lyogel,
   (b) maintaining said lyogel in the presence of said concentrated nitric acid at a temperature of 0° to 50° C. until said lyogel is partially hydrolyzed to form a hydrogel having a swelling capacity of about 20 to 95% by weight of water, and
   (c) removing nitric acid by washing the hydrogel in an aqueous liquid selected from the group consisting of water and water containing an alkaline substance.

* * * * *